(12) United States Patent
Kim et al.

(10) Patent No.: US 7,440,516 B2
(45) Date of Patent: Oct. 21, 2008

(54) APPARATUS AND METHOD FOR RECEIVING DIGITAL MULTIMEDIA BROADCASTING IN A WIRELESS TERMINAL

(75) Inventors: Sung-Gu Kim, Gumi-si (KR);
Hark-Sang Kim, Daegu (KR);
Seok-Hyo Park, Gumi-si (KR)

(73) Assignee: Samsung Electronics Co., Ltd (KR)

( * ) Notice: Subject to any disclaimer, the term of this patent is extended or adjusted under 35 U.S.C. 154(b) by 566 days.

(21) Appl. No.: 11/115,786

(22) Filed: Apr. 27, 2005

(65) Prior Publication Data

US 2005/0265484 A1     Dec. 1, 2005

(30) Foreign Application Priority Data

May 12, 2004    (KR) ............... 10-2004-0033424

(51) Int. Cl.
*H03K 9/00* (2006.01)
*H04L 27/06* (2006.01)
*H04L 27/14* (2006.01)
*H04L 27/22* (2006.01)

(52) U.S. Cl. .................. 375/316; 375/329; 375/340; 455/428; 455/558; 455/3.02; 455/3.04

(58) Field of Classification Search ............ 375/316, 375/219, 220, 222, 329, 340; 455/428, 558, 455/418, 419, 3.02, 3.04

See application file for complete search history.

(56) References Cited

U.S. PATENT DOCUMENTS

| 5,490,284 A * | 2/1996 | Itoh et al. ............ 455/428 |
| 6,252,551 B1 | 6/2001 | Noro et al. |
| 7,054,660 B2 * | 5/2006 | Lord ................. 455/558 |
| 2004/0022326 A1 | 2/2004 | Morrish et al. |

FOREIGN PATENT DOCUMENTS

| EP | 0 896 425 | 2/1999 |
| EP | 1 139 589 | 10/2001 |
| JP | 11-251953 | 9/1999 |
| JP | 2001-168750 | 6/2001 |
| WO | WO 94/07314 | 3/1994 |
| WO | WO 03/088510 | 10/2003 |

OTHER PUBLICATIONS

M. Bolle et al., "The Receiver Engine Chip-Set for Digital Audio Broadcasting", Signals, Systems, and Electronics, 1998.

* cited by examiner

*Primary Examiner*—Phuong Phu
(74) *Attorney, Agent, or Firm*—The Farrell Law Firm, PC

(57) ABSTRACT

Provided are an apparatus and method for receiving digital multimedia broadcasting (DMB) signals in a wireless terminal. The apparatus includes a first antenna for receiving a satellite DMB signal and a first terrestrial DMB signal, a second antenna for receiving a second terrestrial DMB signal, a satellite DMB receiver for processing the satellite DMB signal, a terrestrial DMB receiver for processing the first and second terrestrial DMB signals, and a switch for switching the satellite DMB signal and the first terrestrial DMB signal received by the first antenna to one of the satellite DMB receiver and the terrestrial DMB receiver.

16 Claims, 4 Drawing Sheets

APPARATUS AND METHOD FOR RECEIVING DIGITAL MULTIMEDIA BROADCASTING IN A WIRELESS TERMINAL

PRIORITY

This application claims priority to an application entitled "APPARATUS AND METHOD FOR RECEIVING DIGITAL MULTIMEDIA BROADCASTING IN A WIRELESS TERMINAL", filed in the Korean Intellectual Property Office on May 12, 2004 and assigned Ser. No. 2004-33424, the entire contents of which are incorporated herein by reference.

BACKGROUND OF THE INVENTION

1. Field of the Invention

The present invention relates generally to digital multimedia broadcasting (DMB), and more particularly to an apparatus and method for receiving DMB in a wireless terminal.

2. Description of the Related Art

Digital multimedia broadcasting (DMB) can provide compact disk (CD)-quality level sounds, data and video service, etc. DMB can also provide excellent reception quality to a moving broadcasting receiver. The DMB is classified into terrestrial DMB and satellite DMB according to transmission means (a ground wave or a satellite). That is, DMB is a digital multimedia broadcasting service for providing various high quality digital content (video/audio/data) to a receiver through a cost-effective broadcasting network. The terrestrial DMB provides music and video services using a ground-based terrestrial repeater. The satellite DMB provides a service in a band of 2.6~2.655 GHz corresponding to the ultra high frequency (UHF). For example, when a transmitting station on a Gwanaksan mountain in Korea transmits the radio wave for the terrestrial DMB, the terrestrial DMB service is provided to metropolitan areas in Korea. When the radio wave for the satellite DMB service is transmitted from the satellite located outside the atmosphere to the Korean Peninsula, entire regions in Korea can simultaneously receive the satellite DMB service. If wireless terminals can receive the DMB, users of the wireless terminals will be able to conveniently use the DMB service.

SUMMARY OF THE INVENTION

Therefore, it is an object of the present invention to provide an apparatus and method that can receive digital multimedia broadcasting (DMB) through a wireless terminal.

In accordance with an aspect of the present invention, the above and other objects can be accomplished by an apparatus for receiving digital multimedia broadcasting (DMB) in a wireless terminal. The apparatus includes a first antenna for receiving a satellite DMB signal and a first terrestrial DMB signal; a second antenna for receiving a second terrestrial DMB signal; a satellite DMB receiver for receiving the satellite DMB signal through the first antenna; a terrestrial DMB receiver for receiving the first and second terrestrial DMB signals through the first and second antennas; and a switch for switching the satellite DMB signal and the first terrestrial DMB signal received by the first antenna to one of the satellite DMB receiver and the terrestrial DMB receiver.

In accordance with another aspect of the present invention, the above and other objects can be accomplished by a method for receiving digital multimedia broadcasting (DMB) in a wireless terminal. The method includes displaying available types of DMB, when DMB viewing is selected in a television (TV) mode; receiving and outputting a satellite DMB signal, when satellite DMB is selected by a user from the displayed types of DMB; and receiving and outputting a terrestrial DMB signal, when terrestrial DMB is selected by a user from the displayed types of DMB.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Figure 1:
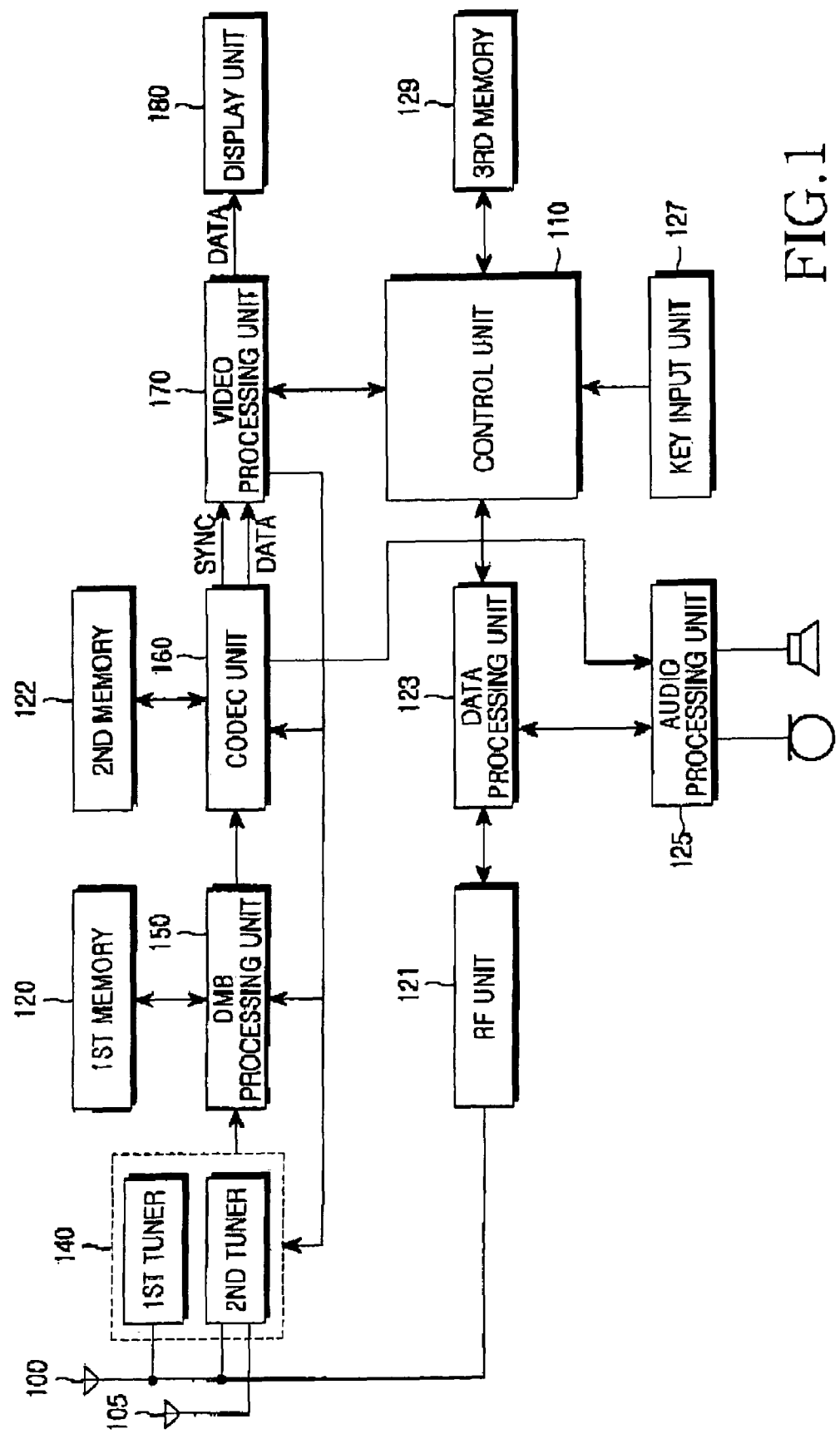
FIG. 1 is a block diagram illustrating a wireless terminal in accordance with an embodiment of the present invention.

Embodiments of the present invention will be described in detail herein below with reference to the accompanying drawings. In the drawings, the same or similar elements are denoted by the same reference numerals even though they are depicted in different drawings.

In embodiments of the present invention, a DMB mode is divided into a satellite DMB mode and a terrestrial DMB mode. The terrestrial DMB mode is divided into a mode of L-Band serving as the European terrestrial DMB band (hereinafter, referred to as the "first terrestrial DMB band"), and a mode of Band-III serving as the Korean terrestrial DMB band (hereinafter, referred to as the "second terrestrial DMB band"). Here, a frequency band of the satellite DMB mode is 2.6~2.65 GHz, a frequency band of the first terrestrial DMB mode is 1452~1492 MHz, and a frequency band of the second terrestrial DMB mode is 174~240 MHz.

Figure 2:
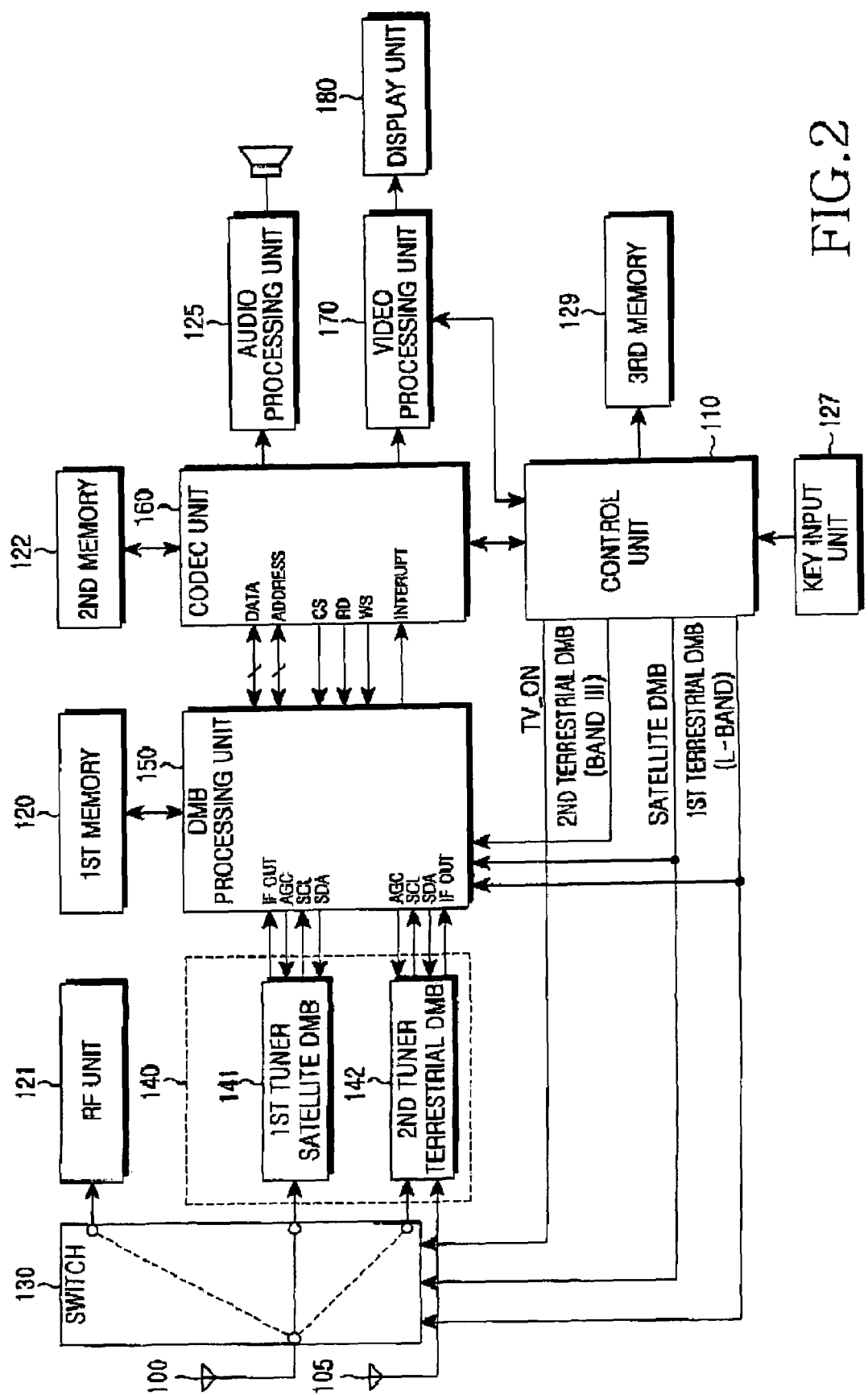
FIG. 2 is a block diagram illustrating a digital multimedia broadcasting (DMB) receiver of FIG. 1.

FIG. 1 is a block diagram illustrating a wireless terminal in accordance with an embodiment of the present invention, and FIG. 2 is a block diagram illustrating a DMB receiver of FIG. 1.

As illustrated in FIGS. 1 and 2, the wireless terminal includes a first antenna 100, a second antenna 105, a control unit 110, a first memory 120, a radio frequency (RF) unit 121, a second memory 122, a data processing unit 123, an audio processing unit 125, a key input unit 127, a third memory 129, a switch 130, a tuning unit 140, a DMB processing unit 150, a coder-decoder (CODEC) unit 160, a video processing unit 170, and a display unit 180.

Referring to FIGS. 1 and 2, the RF unit 121 performs a wireless communication function of the wireless terminal. The RF unit 121 includes an RF transmitter for up converting and amplifying a frequency of a signal to be transmitted, an RF receiver for low-noise amplifying a received signal and down converting a frequency of the received signal, etc. The RF unit 121 transmits a signal to the first antenna 100 through the switch 130, and receives an applied signal through the switch 130.

The data processing unit 123 includes a transmitter for coding and modulating the signal to be transmitted and a receiver for demodulating and decoding the received signal. That is, the data processing unit 123 can be composed of a modulator-demodulator (MODEM) and a coder-decoder (CODEC). The data processing unit 123 may be included in the control unit 110.

The audio processing unit 125 reproduces a received audio signal output from the data processing unit 123 or outputting a transmission audio signal generated from a microphone to the data processing unit 123. More specifically, when the wireless terminal performs a television (TV) mode in accordance with the embodiment of the present invention, the audio processing unit 125 performs a function for reproducing an audio signal of a DMB signal output from the CODEC unit 160.

The key input unit 127 includes keys necessary for inputting number and letter information and function keys necessary for setting various functions. More specifically, the key input unit 127 includes various mode setup keys for processing a DMB signal in accordance with the embodiment of the present invention.

The third memory 129 can be composed of program and data memories, etc. The program memory can store programs for controlling the overall operation of the wireless terminal. More specifically, the program memory can store programs for processing a DMB signal in accordance with the embodiment of the present invention. The third memory 129 performs a function for temporarily storing data generated while the programs are executed.

The control unit 110 controls the overall operation of the wireless terminal in accordance with the embodiment of the present invention, and may include the data processing unit 123.

When the wireless terminal performs a communication mode in accordance with the embodiment of the present invention, the control unit 110 controls the switch 130 to switch a signal received by the first antenna 100 to the RF unit 121, such that a wireless communication function can be performed. When the wireless terminal performs a satellite DMB mode in accordance with the embodiment of the present invention, the control unit 110 controls the switch 130 to switch a satellite DMB signal received by the first antenna 100 to the first tuner 141 of the tuning unit 140.

When the wireless terminal performs the first terrestrial DMB mode in accordance with the embodiment of the present invention, the control unit 110 controls the switch 130 to switch a first terrestrial DMB signal received by the first antenna 100 to the second tuner 142.

When the wireless terminal performs the second terrestrial DMB mode in accordance with the embodiment of the present invention, the control unit 110 applies a second terrestrial DMB signal received by the second antenna 105 to the second tuner 142. When the control unit 110 sets the DMB mode in the DMB processing unit 150 in accordance with the embodiment of the present invention, the control unit 110 controls the DMB processing unit 150 to turn off power for a corresponding DMB mode when not using a predetermined DMB mode. The control unit 110 can reduce power consumption of the CODEC unit 160 using parallel communication in accordance with the embodiment of the present invention.

The first antenna 100 receives communication signals such as code division multiple access (CDMA) and personal communication service (PCS) signals to apply the received communication signals to the switch 130 in accordance with the embodiment of the present invention. More specifically, the first antenna 100 applies the satellite DMB signal and the first terrestrial DMB signal to the switch 130.

The second antenna 105 applies the second terrestrial DMB signal to the second tuner 142 in accordance with the embodiment of the present invention.

The tuning unit 140 receives a selected DMB signal according to a control operation of the control unit 110, and performs a function for converting a frequency of the received DMB signal. The tuning unit 140 includes the first tuner 141 and the second tuner 142 in accordance with the embodiment of the present invention. The first tuner 141 receives and frequency-converts a satellite DMB signal, and the second tuner 142 receives and frequency-converts a terrestrial DMB signal.

The DMB processing unit 150 performs a function for demodulating and decoding DMB signals output from the tuning unit 140 in accordance with the embodiment of the present invention. That is, the DMB processing unit 150 demodulates the DMB signals received by the first and second tuners 141 and 142, separates the demodulated DMB signals into audio and video signals, and performs channel-by-channel decoding, according to a control operation of the control unit 110. The channel-by-channel decoded DMB signals are stored in the first memory 120 serving as a buffer memory.

The CODEC unit 160 decodes the audio and video signals received from the DMB processing unit 150 into signals of the Moving Picture Experts Group (MPEG) format according to a control operation of the control unit 110. The CODEC unit 160 outputs the decoded audio signal to the audio processing unit 125, and outputs the decoded video signal to the video processing unit 170. The decoded audio and video signals are stored in the second memory 122. The second memory 122 can store various data as well as the decoded audio and video signals.

When the wireless terminal performs the DMB mode in accordance with the embodiment of the present invention, the video processing unit 170 processes the video signal output from the CODEC unit 160 and user data output from the control unit 110, and displays the processed signal and the processed user data on corresponding areas of the display unit 180. The video processing unit 170 may be included in the CODEC unit 160.

When the wireless terminal operates in the communication mode, the display unit 180 displays the data output from the control unit 110. When the wireless terminal operates in the DMB mode, the display unit 180 displays the DMB video data and the user data output from the video processing unit 170 on corresponding areas. Here, the display unit 180 can be a liquid crystal display (LCD). In the case of the LCD, the display unit 180 can include an LCD controller, a memory capable of storing video data, an LCD element, etc. When the LCD is implemented using a touch-screen system, the key input unit 127 and the display unit 180 can serve as an input unit.

Figure 3:
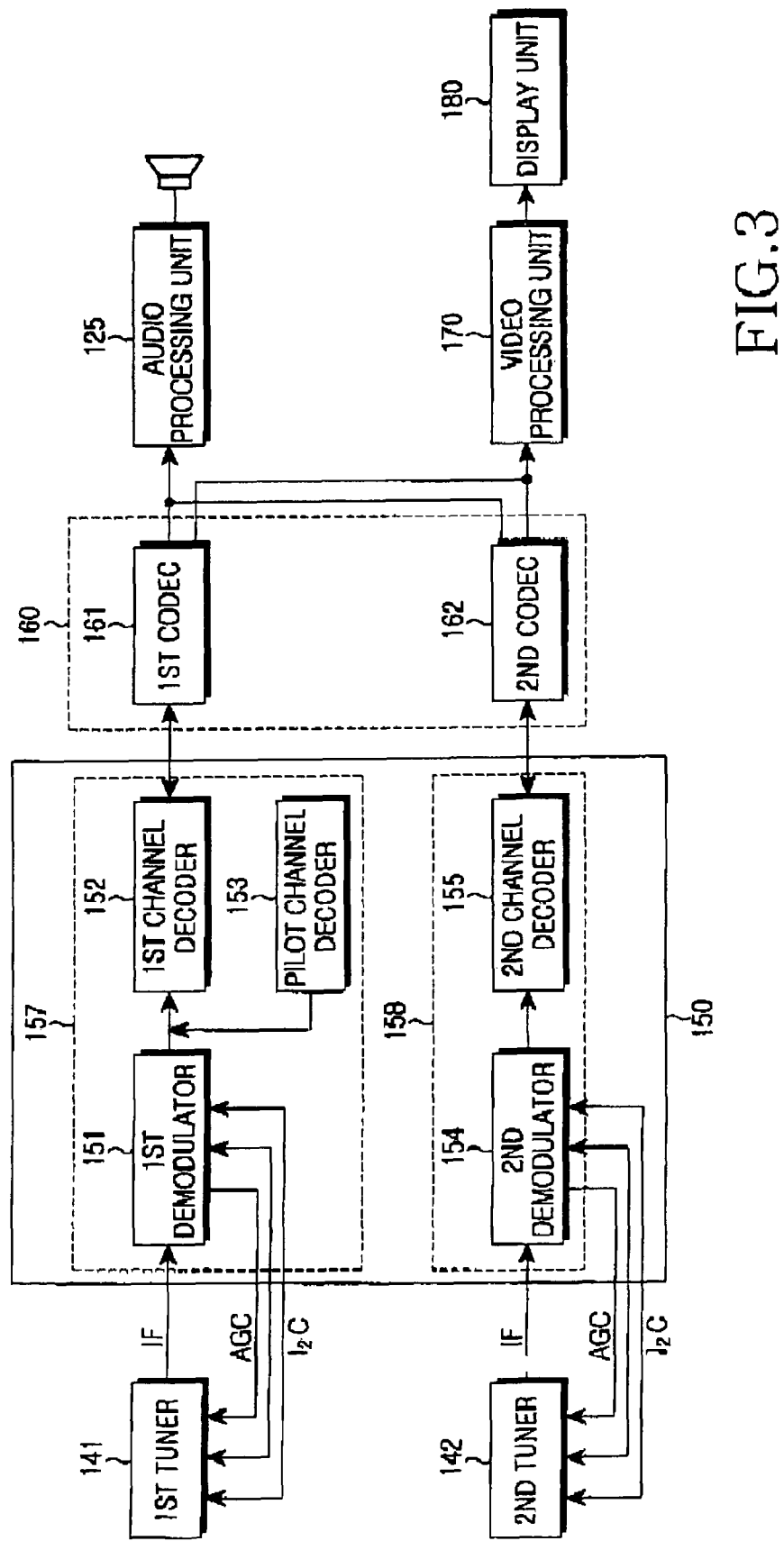
FIG. 3 is a block diagram illustrating details of the DMB receiver of FIG. 2.

FIG. 3 is a block diagram illustrating details of the DMB receiver of FIG. 2.

Referring to FIGS. 1 to 3, the first antenna 100 is constructed to receive the entire range of a communication signal band frequency (CDMA: 800~900 MHz or PCS: 1850~1990 MHz), a satellite DMB signal band frequency (2.63~2.65 GHz), and a first terrestrial DMB signal band frequency (1.45~1.49 GHz).

It is preferred that the first antenna 100 has an internal helical structure and resonates in a desired frequency band. It is preferred that the helical structure includes four helices capable of receiving four band frequencies that is, a CDMA signal, a PCS signal, a satellite DMB signal, and a first terrestrial DMB signal. When a winding interval and the number of windings in the helical structure are adjusted, a signal of a desired frequency band can be received.

The second antenna 105 receives band frequencies (174~240 MHz) of the second terrestrial DMB signal, and can be constructed by a whip antenna.

While the wireless terminal operates in the communication mode, the switch 130 switches an RF communication signal received by the first antenna 100 to the RF unit 121 according to a control operation of the control unit 110. While the wireless terminal operates in the satellite DMB mode, the switch 130 switches the satellite DMB signal received by the first antenna 100 to the first tuner 141 according to a control operation of the control unit 110.

While the wireless terminal operates in the first terrestrial DMB mode, the switch 130 switches the first terrestrial DMB signal received by the first antenna 100 to the second tuner 142 according to a control operation of the control unit 110.

The satellite DMB receiver includes the first tuner 141, a first DMB processor 157, and a first CODEC 161.

The first tuner 141 receives the satellite DMB signal from the switch 130, and then frequency-converts the received satellite DMB signal. That is, the first tuner 141 is an integrated circuit (IC) for down converting the satellite DMB signal frequency into an intermediate frequency (IF) signal (38 or 2 MHz).

The DMB processing unit 150 includes the first DMB processor 157, and the second DMB processor 158.

The first DMB processor 157 demodulates and decodes the satellite DMB signal according to a control operation of the control unit 110, and includes a first demodulator 151, a first channel decoder 152, and a pilot channel decoder 153.

The first demodulator 151 demodulates an analog satellite DMB signal received from the first tuner 141 into a digital signal. At this point, the first demodulator 151 uses code division multiplexing (CDM). More specifically, the first demodulator 151 separates the digital satellite DMB signal into audio and video signals.

The first channel decoder 152 decodes the digital satellite DMB signal received from the first demodulator 151 from each channel. The decoded digital satellite DMB signal is stored in the first memory 120.

The pilot channel decoder 153 is provided to implement synchronization between transmission and reception operations. Because a satellite DMB coding technique is CDM, a pilot channel is needed for the synchronization between the transmission and the reception operations.

The first CODEC 161 decodes the audio and video signals separated from the received satellite DMB signal by the first DMB processor 157 according to a control operation of the control unit 110. The first CODEC 161 outputs the decoded audio signal to a speaker through the audio processing unit 125, and displays the decoded video signal on the display unit 180 through the video processing unit 170.

The terrestrial DMB receiver includes the second tuner 142, the second DMB processor 158, and a second CODEC 162.

The second tuner 142 receives the first terrestrial DMB signal from the switch 130, and then frequency-converts the received first terrestrial DMB signal. The second tuner 142 receives the second terrestrial DMB signal from the second antenna 105, and then frequency-converts the received second terrestrial DMB signal. That is, the second tuner 142 is an IC for down converting the first and second terrestrial DMB signal frequencies into IF signals (38 or 2 MHz).

The second DMB processor 158 demodulates and decodes the terrestrial DMB signals according to a control operation of the control unit 110, and includes a second demodulator 154, and a second channel decoder 155. The second demodulator 154 demodulates the first and second terrestrial DMB signals into digital signals. The second demodulator 154 uses orthogonal frequency division multiplexing (OFDM). OFDM is to be adopted as a modulation technique in European, Japanese, and Australian digital TV standards. When the OFDM technique is used, data can be distributed to a large number of frequency carriers that are separated from each other by a predetermined interval. The OFDM technique provides orthogonality so that a corresponding demodulator will not receive a different frequency other than its own frequency.

The second demodulator 154 separates, into audio and video signals, the first and second terrestrial DMB signals converted into the digital signals.

The second channel decoder 155 decodes the first and second terrestrial DMB signals received from the second demodulator 154 for each channel. The decoded first and second terrestrial DMB signals are stored in the first memory 120.

The second CODEC 162 decodes the audio and video signals separated from the received first and second terrestrial DMB signals by the second DMB processor 158 according to a control operation of the control unit 110. The second CODEC 162 outputs the decoded audio signal to the speaker through the audio processing unit 125, and displays the decoded video signal on the display unit 180 through the video processing unit 170.

The following Table 1 illustrates the control signals transmitted and received between the tuner unit 140 (i.e. the first and second tuners 141 and 142) and the DMB processing unit 150.

TABLE 1

| Signal | Description |
| --- | --- |
| AGC | AGC is controlled in a baseband such that a constant IF signal (−6 dBm) is output even when a level of an RF level varies. |
| SDA | SERIAL DATA: Tuner register setting => CH data |
| SCL | SERIAL CLOCK: Sync signal |
| IF | IF analog signal |

The following Table 2 illustrates the control signals transmitted and received between the DMB processing unit 150 and the CODEC unit 160.

TABLE 2

| Signal | Description |
| --- | --- |
| D(0:15) | Data of 16 or 8 bits |
| A(0:15) | Address signal: Address assignment |
| INTERRUPT | Signal sent before sending data among baseband CODEC and control units. |
| Chip Select | Chip Select is a chip select signal, and access to an assigned memory address is performed when a chip is selected. |
| RD | Data read |
| WR | Data write |

The operation of the wireless terminal in the DMB mode will be described with reference to FIG. 4.

Figure 4:
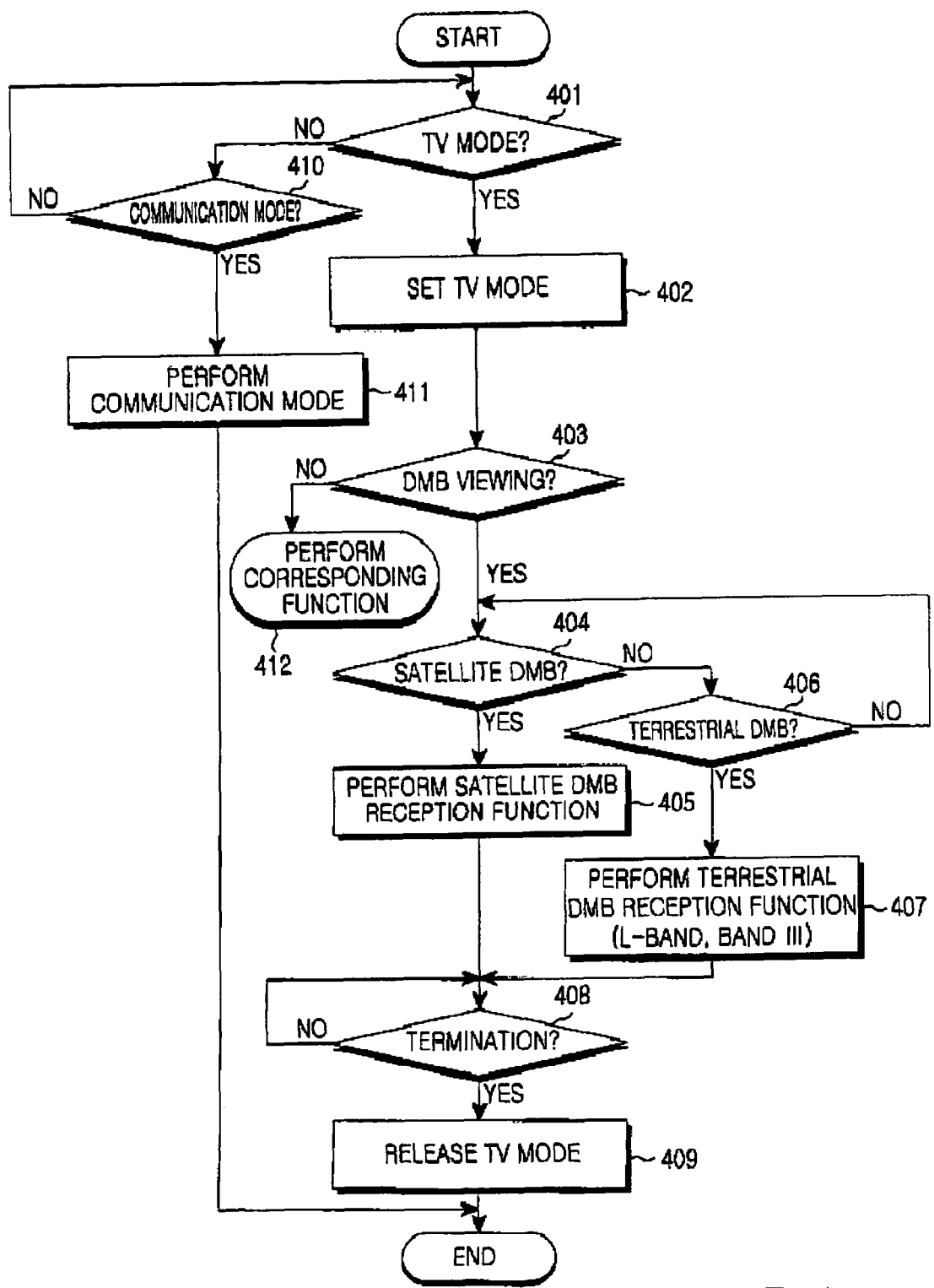
FIG. 4 is a flow chart illustrating a process for receiving DMB in the wireless terminal in accordance with an embodiment of the present invention.

FIG. 4 is a flow chart illustrating a process for receiving DMB in the wireless terminal in accordance with an embodiment of the present invention.

Referring to FIGS. 1 to 4, when a user of the wireless terminal selects a TV mode, the control unit 110 senses the selected TV mode in step 401, and sets the wireless terminal to the TV mode in step 402.

When the user inputs a menu key while the wireless terminal is operating in the TV mode, the control unit 110 controls the display unit 180 to display selection items for TV viewing, that is, a menu for TV viewing.

When "DMB viewing", or a similar menu item, is selected from the menu for TV viewing according to user selection information (e.g., a key input), the control unit 110 controls the display unit 180 to display the available types of DMB signals in step 403. Here, the types of DMB signals are satellite DMB and terrestrial DMB.

When "satellite DMB", or a similar menu item, is selected from the displayed types of DMB signals, the control unit 110 senses the selected "satellite DMB" in step 404, and proceeds to step 405 in which a satellite DMB reception function is performed.

In step 405, the control unit 110 controls the switch 130 to switch a satellite DMB signal received by the first antenna 100 to the first tuner 141.

When the satellite DMB signal is received from the switch 130, the first tuner 141 frequency-converts the satellite DMB signal, and then applies the frequency-converted satellite DMB signal to the first DMB processor 157. The first demodulator 151 of the first DMB processor 157 demodulates an analog signal of the applied satellite DMB signal into a digital signal and then separates the digital signal into audio and video signals according to a control operation of the control unit 110. The demodulated satellite DMB signal is decoded through the first channel decoder 153 for each channel, and the decoded satellite DMB signal is stored in the first memory 120. At this point, the pilot channel decoder 153 performs synchronization between transmitted and received satellite DMB signals. The audio and video signals are applied from the first DMB processor 157 to the first CODEC 161. The first CODEC 161 decodes the applied audio and video signals according to a control operation of the control unit 110, and then stores the decoded audio and video signals in the second memory 122. The first CODEC 161 outputs the decoded audio signal to the speaker through the audio processing unit 125, and displays the decoded video signal on the display unit 180 through the video processing unit 170.

On the other hand, when "terrestrial DMB", or a similar menu item, is selected from the types of DMB signals according to the user selection information, the control unit 110 senses the selected "terrestrial DMB" in step 406, and proceeds to step 407 in which a terrestrial DMB reception function is performed.

In step 407, when the first antenna 100 receives a first terrestrial DMB signal, the control unit 110 controls the switch 130 to switch the received first terrestrial DMB signal to the second tuner 142.

In step 407, when the second antenna 105 receives a second terrestrial DMB signal, the control unit 110 controls the switch 130 to switch the received second terrestrial DMB signal to the second tuner 142. Because the processes for receiving the first and second terrestrial DMB signals are the same as each other in the embodiment of the present invention, two signals are generally referred to as the terrestrial DMB signals.

Upon receiving the terrestrial DMB signals (i.e. the first and second terrestrial DMB signals), the second tuner 142 frequency-converts the terrestrial DMB signals, and applies the frequency-converted terrestrial DMB signals to the second DMB processor 158.

The second demodulator 154 of the second DMB processor 158 demodulates analog signals of the applied terrestrial DMB signals into digital signals and then separates the demodulated terrestrial DMB signals into audio and video signals according to a control operation of the control unit 110. The audio and video signals are output by the audio processing unit 125 and the display unit 180 through the CODEC unit 160, respectively.

When the user selects to terminate a corresponding function while the satellite DMB reception function or the terrestrial DMB reception function is performed, the control unit 110 senses the selected function termination in step 408, and proceeds to step 409 in which the TV mode is released.

On the other hand, when the user of the wireless terminal selects a communication mode for conducting a wireless communication, the control unit 110 proceeds to step 411 in which the communication mode is performed.

In step 411, the control unit 110 controls the switch 130 to switch a communication signal received by the first antenna 100 to the RF unit 121.

The RF unit 121 performs the wireless communication function through the communication signal received from the switch 130.

Although certain embodiments of the present invention associated with a wireless terminal have been disclosed for illustrative purposes, those skilled in the art will appreciate that various modifications, additions and substitutions are possible, without departing from the scope of the present invention. Therefore, the present invention is not limited to the above-described embodiments, but is defined by the following claims, along with their full scope of equivalents.

As apparent from the above description, the present invention provides an apparatus for receiving digital multimedia broadcasting (DMB) in a wireless terminal that can receive DMB as well as perform a communication function using the wireless terminal, such that convenience for users can be improved.

What is claimed is:

1. An apparatus for receiving digital multimedia broadcasting (DMB) signals in a wireless terminal, comprising:
   a first antenna for receiving a satellite DMB signal and a first terrestrial DMB signal;
   a second antenna for receiving a second terrestrial DMB signal;
   a satellite DMB receiver for processing the satellite DMB signal;
   a terrestrial DMB receiver for processing the first and second terrestrial DMB signals; and
   a switch for switching the satellite DMB signal and the first terrestrial DMB signal received by the first antenna to one of the satellite DMB receiver and the terrestrial DMB receiver.

2. The apparatus according to claim 1, wherein the satellite DMB receiver comprises:
   a first tuner for receiving the satellite DMB signal applied through the switch;
   a first DMB processor for demodulating the satellite DMB signal received by the first tuner, separating the demodulated satellite DMB signal into audio and video signals, and decoding each channel; and
   a first coder-decoder (CODEC) for decoding the audio and video signals separated from the satellite DMB signal by the first DMB processor, and outputting the decoded audio and video signals.

3. The apparatus according to claim 2, wherein the first DMB processor comprises:
   a first demodulator for demodulating the satellite DMB signal applied from the first tuner, and separating the demodulated satellite DMB signal into the audio and video signals;
   a first channel decoder for decoding each channel of the satellite DMB signal demodulated by the first demodulator; and a pilot channel decoder for synchronizing transmitted and received satellite DMB signals.

4. The apparatus according to claim 1, wherein the terrestrial DMB receiver comprises:
a second tuner for receiving the first terrestrial DMB signal applied through the switch, and the second terrestrial DMB signal applied through the second antenna;
a second DMB processor for demodulating the first and second terrestrial DMB signals received by the second tuner, separating the demodulated first and second terrestrial DMB signals into audio and video signals, and decoding each channel; and
a second coder-decoder (CODEC) for decoding the audio and video signals separated from the first and second terrestrial DMB signals by the second DMB processor, and outputting the decoded audio and video signals.

5. The apparatus according to claim 4, wherein the second DMB processor comprises:
a second demodulator for demodulating the first and second terrestrial DMB signals received by the second tuner, and separating the demodulated first and second terrestrial DMB signals into the audio and video signals; and
a second channel decoder for decoding each channel of the first and second terrestrial DMB signals demodulated by the second demodulator.

6. The apparatus according to claim 1, wherein the switch switches a communication signal received through the first antenna to a radio frequency (RF) unit for performing a wireless communication function, when the wireless terminal performs a communication mode.

7. The apparatus according to claim 1, wherein the wireless terminal comprises a mobile phone.

8. The apparatus according to claim 1, wherein a frequency band of the satellite DMB mode is between 2.6 to 2.65 GHz, a frequency band of the first terrestrial DMB mode is between 1452 to 1492 MHz, and a frequency band of the second terrestrial DMB mode is between 174 to 240 MHz.

9. A method for receiving digital multimedia broadcasting (DMB) in a wireless terminal, comprising:
displaying available types of DMB signals, when DMB viewing is selected in a television (TV) mode;
when satellite DMB is user selected from the displayed types of DMB signals, receiving and outputting a satellite DMB signal; and
when terrestrial DMB is user selected from the displayed types of DMB signals, receiving and outputting one of a first terrestrial DMB signal and a second terrestrial DMB signal,
wherein the satellite DMB signal and the first terrestrial DMB signal are received through a first antenna of the wireless terminal and the second terrestrial DMB signal is received through a second antenna of the wireless terminal.

10. The method according to claim 9, wherein the steps of receiving further comprise:
receiving the satellite DMB signal;
demodulating the received satellite DMB signal;
separating the demodulated satellite DMB signal into audio and video signals;
performing channel-by-channel decoding; and
decoding the audio and video signals separated from the satellite DMB signal and outputting the decoded audio and video signals.

11. The method according to claim 10, wherein the step of demodulating further comprises:
demodulating the satellite DMB signal, and separating the demodulated satellite DMB signal into the audio and video signals;
decoding the demodulated satellite DMB signal; and
performing synchronization between transmitted and received satellite DMB signals.

12. The method according to claim 9, wherein the step of receiving the first and second terrestrial signals further comprises:
receiving the first terrestrial DMB signal from a switch, and the second terrestrial DMB signal through a second antenna;
demodulating the first and second terrestrial DMB signals;
separating the demodulated first and second terrestrial DMB signals into audio and video signals;
performing channel-by-channel decoding; and
decoding the audio and video signals separated from the first and second terrestrial DMB signals and outputting the decoded audio and video signals.

13. The method according to claim 12, wherein the step of demodulating the first and second terrestrial DMB signals further comprises:
demodulating the received first and second terrestrial DMB signals; separating the demodulated first and second terrestrial DMB signals into the audio and video signals; and
decoding the demodulated first and second terrestrial DMB signals channel by channel.

14. The method according to claim 9, further comprising:
switching a communication signal received through the first antenna to a radio frequency (RF) unit for performing a wireless communication function, when the wireless terminal performs a communication mode.

15. The method of claim 9, wherein the wireless terminal comprises a mobile phone.

16. The method according to claim 9, wherein a frequency band of the satellite DMB signal is between 2.6 to 2.65 GHz, and a frequency band of the terrestrial DMB signal is between one of 1452 to 1492 MHz and 174 to 240 MHz.

\* \* \* \* \*